(12) United States Patent
Tai et al.

(10) Patent No.: US 6,969,980 B1
(45) Date of Patent: Nov. 29, 2005

(54) NOISE-RESISTANT PULSE WIDTH MODULATOR

(75) Inventors: Liang-Pin Tai, Tainan Hsien (TW); Kent Hwang, Tao-Yuan Hsien (TW); Jian-Rong Huang, Hsin-Chu (TW); Kuo-Ping Liu, Hsin-Chu (TW); Cheng-Hsuan Fan, Hsin-Chu Hsien (TW); Ko-Cheng Wang, Nan-Tou Hsien (TW); Yu-Fan Liao, Feng-Shan (TW)

(73) Assignee: Richtek Technology Corp., Chu-Pei (TW)

( * ) Notice: Subject to any disclaimer, the term of this patent is extended or adjusted under 35 U.S.C. 154(b) by 0 days.

(21) Appl. No.: 10/850,164

(22) Filed: May 21, 2004

(51) Int. Cl.[7] .............................................. G05F 1/44
(52) U.S. Cl. ..................................... 323/284; 323/271
(58) Field of Search .............................. 323/268, 271, 323/282–284

(56) References Cited

U.S. PATENT DOCUMENTS 6,369,557 B1 * 4/2002 Agiman ...................... 323/282
6,674,272 B2 * 1/2004 Hwang ....................... 323/284
6,844,710 B2 * 1/2005 Lipcsei et al. ............... 323/284
6,873,140 B2 * 3/2005 Saggini et al. .............. 323/283

* cited by examiner

*Primary Examiner*—Gary L. Laxton
(74) *Attorney, Agent, or Firm*—Finnegan, Henderson, Farabow, Garrett & Dunner, L.L.P.

(57) ABSTRACT

A pulse width modulator includes an amplifier module, a comparator module, and a filter module. The amplifier module receives a feedback voltage signal from a passive network, and generates first and second non-inverted voltage signals and first and second inverted voltage signals in response to the feedback voltage signal. The comparator module receives the first and second non-inverted voltage signals and the first and second inverted voltage signals, and provides first and second differential voltage signals corresponding to the first and second non-inverted voltage signals and the first and second inverted voltage signals. The filter module is coupled between the amplifier module and the comparator module, and is operable so as to attenuate high frequency components of the first and second non-inverted voltage signals. As such, the presence of noise in the feedback voltage signal does not affect differential operation of the comparator module.

12 Claims, 8 Drawing Sheets

NOISE-RESISTANT PULSE WIDTH MODULATOR

BACKGROUND OF THE INVENTION

1. Field of the Invention

The invention relates to a pulse width modulator, more particularly to a noise-resistant pulse width modulator.

2. Description of the Related Art

Figure 1:
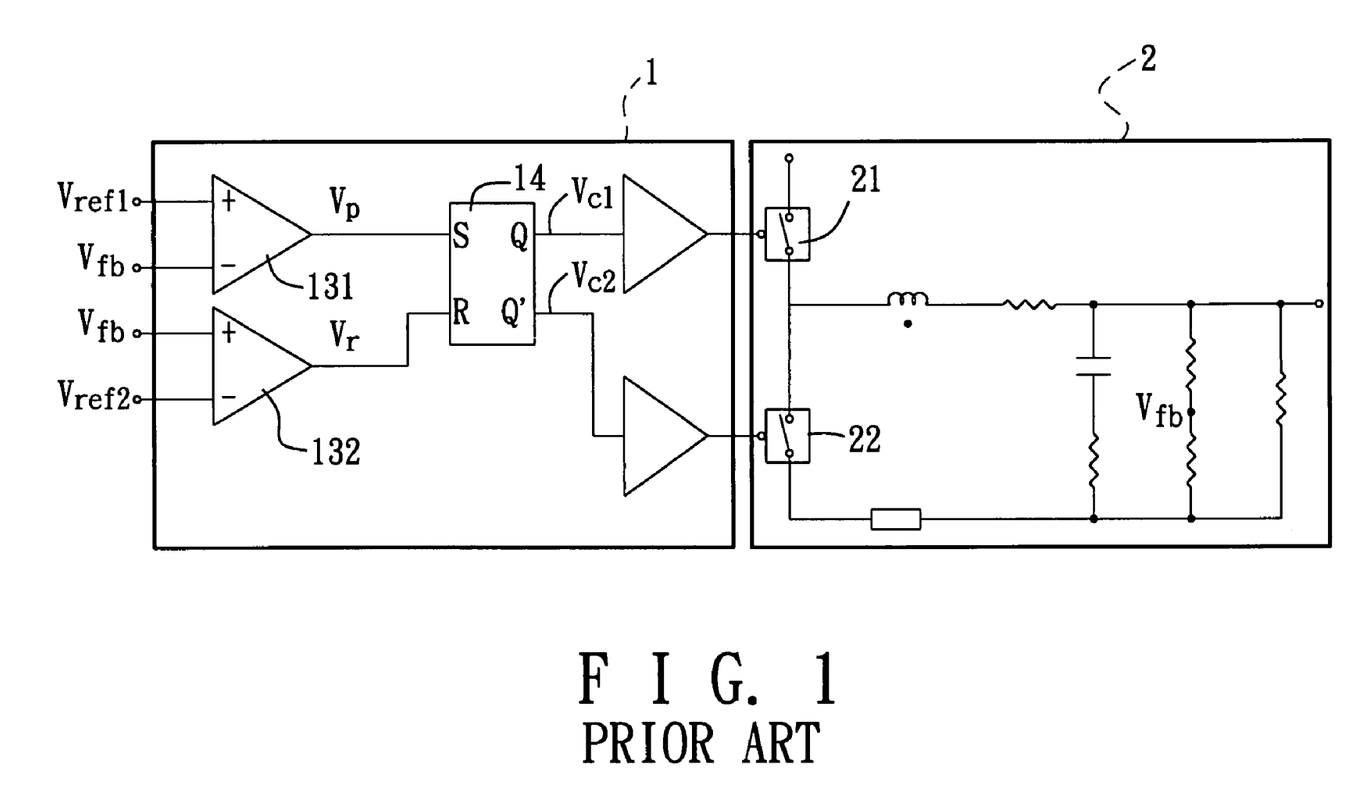
FIG. 1 is a schematic circuit diagram of a conventional pulse width modulator coupled to a passive network for hysteresis control.
Figure 2A:
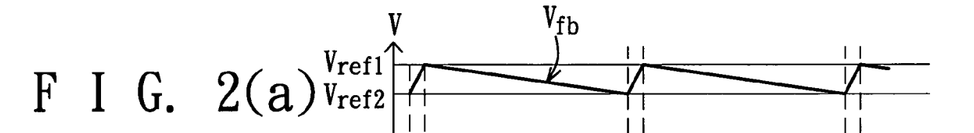
FIGS. 2(a) to 2(d) are time charts to illustrate the relation among a noiseless feedback voltage signal (Vfb), a first reference voltage signal (Vfer1), a second reference voltage signal (Vref2), a first differential voltage signal (Vp), a second differential voltage signal (Vr), and a control signal (Vc)
Figure 2B:
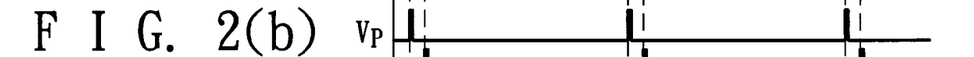
Figure 2C:
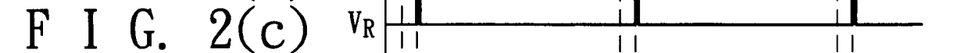
Figure 2D:
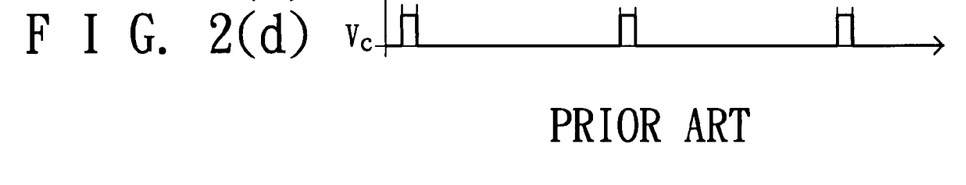

A conventional pulse width modulator 1, as shown in FIG. 1, includes a first differential amplifier 131, a second differential amplifier 132, and an RS flip-flop 14. The conventional pulse width modulator 1 is operable so as to provide a pair of complementary control signals (Vc1, Vc2), each of which controls on and off operations of a respective one of first and second switches 21, 22 of a passive network 2 such that a feedback voltage signal (Vfb) is obtained from the passive network 2. The first differential amplifier 131 has a non-inverting input terminal that receives a first reference voltage signal (Vref1), an inverting input terminal that receives the feedback voltage signal (Vfb), and an output terminal that provides a first differential voltage signal (Vp) corresponding to the first reference voltage signal (Vref1) and the feedback voltage signal (Vfb). On the other hand, the second differential amplifier 132 has an inverting input terminal that receives a second reference voltage signal (Vref2), a non-inverting input terminal that receives the feedback voltage signal (Vfb), and an output terminal that provides a second differential voltage signal (Vr) corresponding to the second reference voltage signal (Vref2) and the feedback voltage signal (Vfb).

The RS flip-flop 14 has an S input that receives the first differential voltage signal (Vp), an R input that receives the second differential voltage signal (Vr), and Q and Q' outputs, each of which provides a respective one of the complementary control signals (Vc1, Vc2).

In operation, with further reference to FIGS. 2(a) to 2(d), when the voltage level of the sawtooth feedback voltage signal (Vfb) is lower than that of the second reference voltage signal (Vref2), the first differential voltage signal (Vp) sets the RS flip-flop 14 such that the complementary control signals (Vc1, Vc2) control operations of the first and second switches 21, 22 in the on and off states, respectively. On the other hand, when the voltage level of the feedback reference voltage (Vfb) is higher than that of the first reference voltage signal (Vref1), the second differential voltage signal (Vr) resets the RS flip-flop 14 such that the complementary control signals (Vc1, Vc2) control operations of the first and second switches 21, 22 in the off and on states, respectively.

Figure 3A:
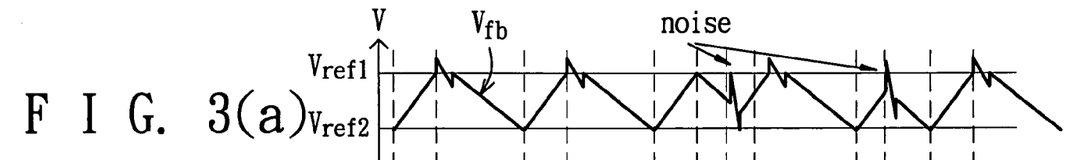
FIGS. 3(a) and 3(b) are time charts to illustrate the relation among a noise-affected Vfb, the Vref1, the Vref2, and the Vp.
Figure 3B:
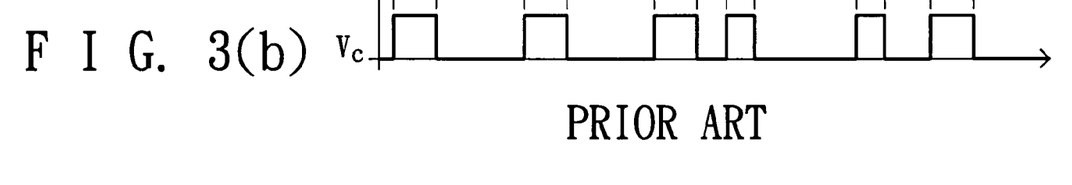

Although the conventional pulse width modulator 1 achieves its intended purpose, in an actual operation, noise is present in the feedback voltage signal (Vfb) The noise in the feedback voltage signal (Vfb) causes erratic behavior of the conventional pulse width modulator 1, as illustrated in FIGS. 3(a) and 3(b). That is, when the level of the noise-affected feedback voltage signal (Vfb) becomes higher than that of the first reference voltage signal (Vref1), or lower than that of the second reference voltage signal (Vref2), the RS flip-flop 14 may be erroneously set or reset by the first or second differential voltage signal (Vp, Vr). As such, the complementary control signals (Vc1, Vc2) control operations of the first and second switches 21, 22 in an unpredictable manner. Furthermore, noise may also appear in one of the first and second reference voltage signals (Vref1, Vref2). This, too, contributes to the erratic behavior of the conventional pulse width modulator.

SUMMARY OF THE INVENTION

Therefore, the object of the present invention is to provide a noise-resistant pulse width modulator so as to overcome the aforesaid drawbacks of the prior art.

According to the present invention, a pulse width modulator is operable so as to provide control signals for controlling on and off operations of a pair of switches of a passive network such that a feedback voltage signal is obtained from the passive network. The pulse width modulator includes an amplifier module, a comparator module, a filter module, and a flip-flop. The amplifier module is adapted to receive the feedback voltage signal, and is operable so as to generate first and second non-inverted voltage signals and first and second inverted voltage signals in response to the feedback voltage signal. The comparator module includes first and second differential amplifiers. The first differential amplifier has a first input terminal that receives the first non-inverted voltage signal, a second input terminal that receives the first inverted voltage signal, and an output terminal that provides a first differential voltage signal corresponding to the first non-inverted voltage signal and the first inverted voltage signal. The second differential amplifier has a first input terminal that receives the second inverted voltage signal, a second input terminal that receives the second non-inverted voltage signal, and an output terminal that provides a second differential voltage signal corresponding to the second non-inverted voltage signal and the second inverted voltage signal. The filter module is coupled between the amplifier module and the comparator module, and is operable so as to attenuate high frequency components of one set of the first and second non-inverted voltage signals and the first and second inverted voltage signals. The flip-flop has an input side that receives the first and second differential voltage signals, and an output side that provides the control signals in response to the first and second differential voltage signals.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
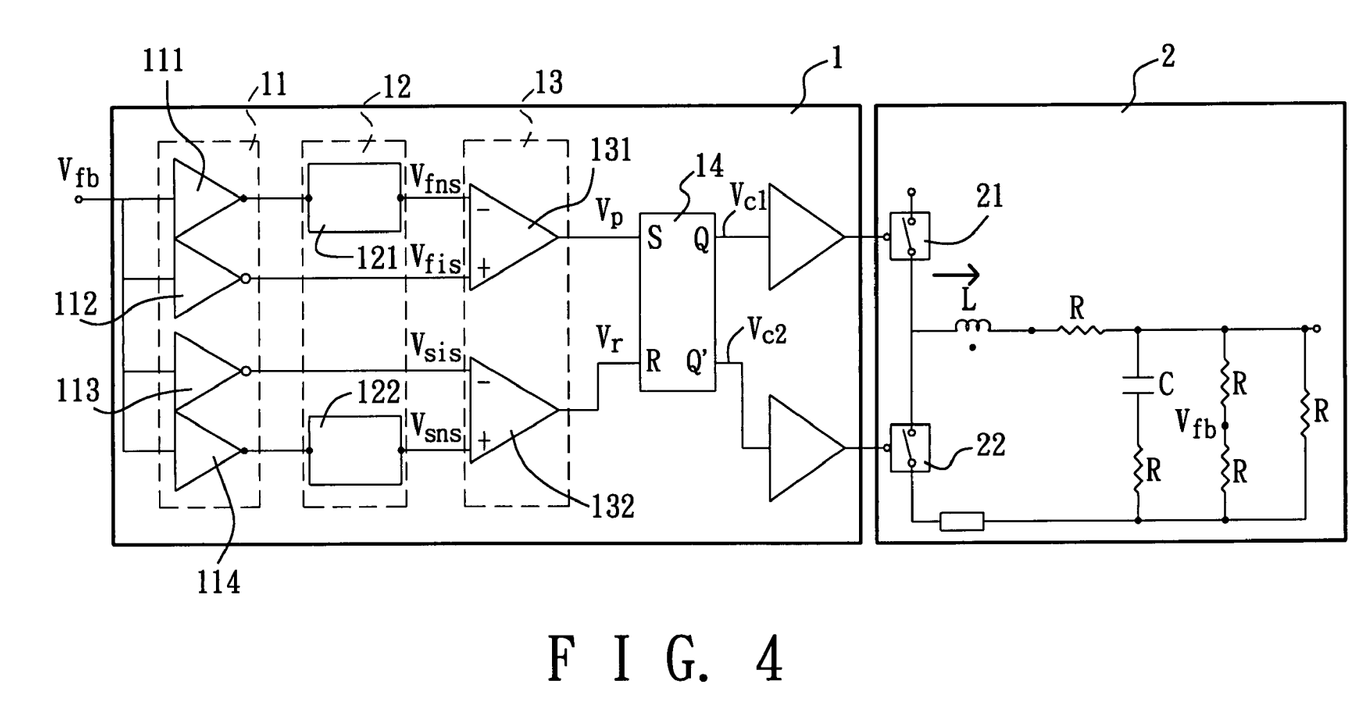
FIG. 4 is a schematic circuit diagram of the first preferred embodiment of a pulse width modulator coupled to a passive network according to the present invention.
Figure 5A:
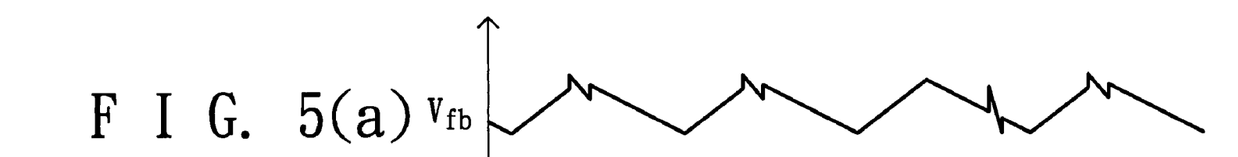
FIGS. 5(a) to 5(f) are time charts to illustrate the relation among a feedback voltage signal (Vfb), first and second non-inverted voltage signals (Vfns, Vsns), first and second inverted voltage signals (Vfis, Vsis), first and second differential signals (Vp, Vr), and a control signal (Vc1)
Figure 5B:
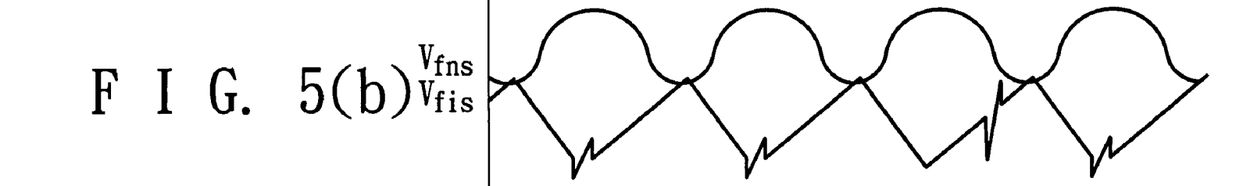
Figure 5C:
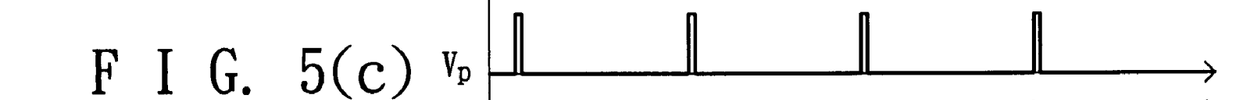
Figure 5D:
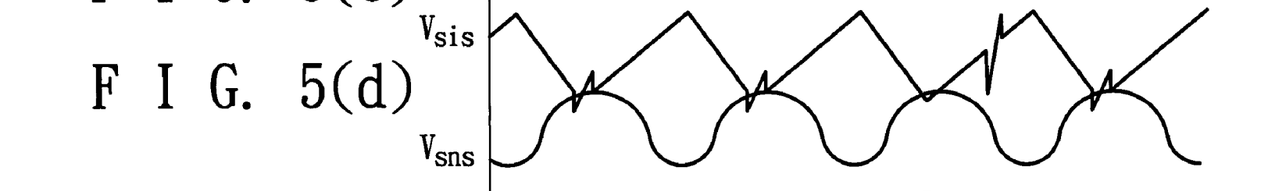
Figure 5E:
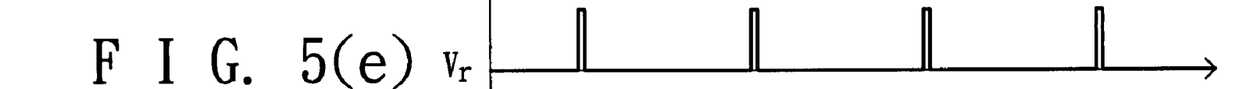
Figure 5F:
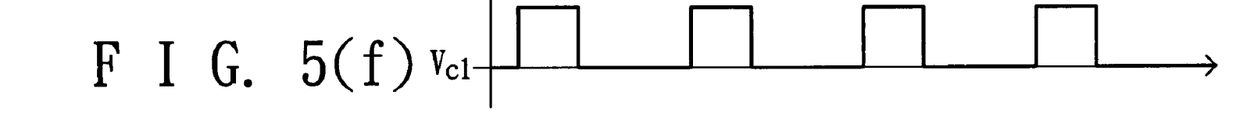

Referring to FIG. 4, the first preferred embodiment of a pulse width modulator 1 according to the present invention is shown to include an amplifier module 11, a comparator module 13, a filter module 12, and a flip-flop 14.

The pulse width modulator 1, which is configured for hysteresis control in this embodiment, is operable so as to provide a pair of complementary control signals (Vc1, Vc2), each of which controls on and off operations of a respective one of first and second switches 21, 22 of a passive network 2 such that a sawtooth feedback voltage signal (Vfb) is obtained from the passive network 2 in a known manner. The passive network 2 includes an inductor (L), a capacitor (C), and a plurality of resistors (R).

The amplifier module 11 is adapted to receive the feedback voltage signal (Vfb), and is operable so as to generate first and second non-inverted voltage signals (Vfns, Vsns) and first and second inverted voltage signals (Vfis, Vsis) in response to the feedback voltage signal (Vfb). In particular, the amplifier module 11 includes first and second non-inverting amplifiers 111, 114, and first and second inverting amplifiers 112, 113. The first non-inverting amplifier 111 has an input terminal that receives the feedback voltage signal (Vfb), and an output terminal that provides the first non-inverted voltage signal (Vfns). The second non-inverting amplifier 114 has an input terminal that receives the feedback voltage signal (Vfb), and an output terminal that provides the second non-inverted voltage signal (Vsns). The first inverting amplifier 112 has an input terminal that receives the feedback voltage signal (Vfb), and an output terminal that provides the first inverted voltage signal (Vfis). The second inverting amplifier 113 has an input terminal that receives the feedback voltage signal (Vfb), and an output terminal that provides the second inverted voltage signal (Vsis). It is noted that each of the amplifiers 111, 112, 113, 114 of the amplifier module 11 has an amplifier gain independent of those of the other ones of the amplifiers 111, 112, 113, 114. It is also noted that the amplifier gain of each of the amplifiers 111, 112, 113, 114 of the amplifier module 11 can be varied so as to adjust a respective one of the voltage signals (Vfns, Vsns, Vfis, Vsis) to an appropriate voltage level.

The comparator module 13 includes first and second differential amplifiers 131, 132. The first differential amplifier 131 has a first input terminal that receives the first non-inverted voltage signal (Vfns), a second input terminal that receives the first inverted voltage signal (Vfis), and an output terminal that provides a first differential voltage signal (Vp) corresponding to the first non-inverted voltage signal (Vfns) and the first inverted voltage signal (Vfis). Similarly, the second differential amplifier 132 has a first input terminal that receives the second inverted voltage signal (Vsis), a second input terminal that receives the second non-inverted voltage signal (Vsns), and an output terminal that provides a second differential voltage signal (Vr) corresponding to the second non-inverted voltage signal (Vsns) and the second inverted voltage signal (Vsis). It is noted that, in this embodiment, the first and second input terminals of the first differential amplifier 131 are inverting and non-inverting input terminals, respectively, and the first and second input terminals of the second differential amplifier 132 are inverting and non-inverting input terminals, respectively.

The filter module 12 is coupled between the amplifier module 11 and the comparator module 13, and is operable so as to attenuate high frequency components of the first and second non-inverted voltage signals (Vfns, Vsns). In particular, the filter module 12 includes first and second low-pass filter circuits 121, 122. The first low-pass filter circuit 121 is coupled between the output terminal of the first non-inverting amplifier 111 and the first input terminal of the first differential amplifier 131, whereas the second low-pass filter circuit 122 is coupled between the output terminal of the second non-inverting amplifier 114 and the second input terminal of the second differential amplifier 132. It is noted that, in an alternative embodiment, the filter module 12 is coupled between the amplifier module 11 and the comparator module 13 such that the filter module 12 is operable so as to attenuate high frequency components of the first and second inverted voltage signals (Vfis, Vsis).

The flip-flop 14 has an input side that receives the first and second differential voltage signals (Vp, Vr) and an output side that provides the complementary control signals (Vc1, Vc2) in response to the first and second differential voltage signals (Vp, Vr). It is noted that, in this embodiment, the flip-flop 14 is an RS flip-flop. The input side of the flip-flop 14 has an S input that receives the first differential voltage signal (Vp), and an R input that receives the second differential voltage signal (Vr). The output side of the flip-flop 14 has a Q output that provides one of the complementary control signals (Vc1, Vc2), and a Q' output that provides the other one of the complementary control signals (Vc1, Vc2).

In operation, with further reference to FIGS. 5(a) to 5(f), when the voltage level of the first non-inverted voltage signal (Vfns) is lower than that of the first inverted voltage signal (Vfis), the voltage level of the second inverted voltage signal (Vsis) is higher than that of the second non-inverted voltage signal (Vsns) and the first differential voltage signal (Vp) sets the flip-flop 14 such that the complementary control signals (Vc1, Vc2) control operations of the first and second switches 21, 22 in the on and off states, respectively. On the other hand, when the voltage level of the first non-inverted voltage signal (Vfns) is higher than that of the first inverted voltage signal (Vfis), the voltage level of the second inverted voltage signal (Vsis) is lower than that of the second non-inverted voltage signal (Vsns), and the second differential voltage signal (Vr) resets the flip-flop such that the complementary control signals (Vc1, Vc2) control operations of the first and second switches 21, 22 in the off and on states, respectively.

Figure 6:
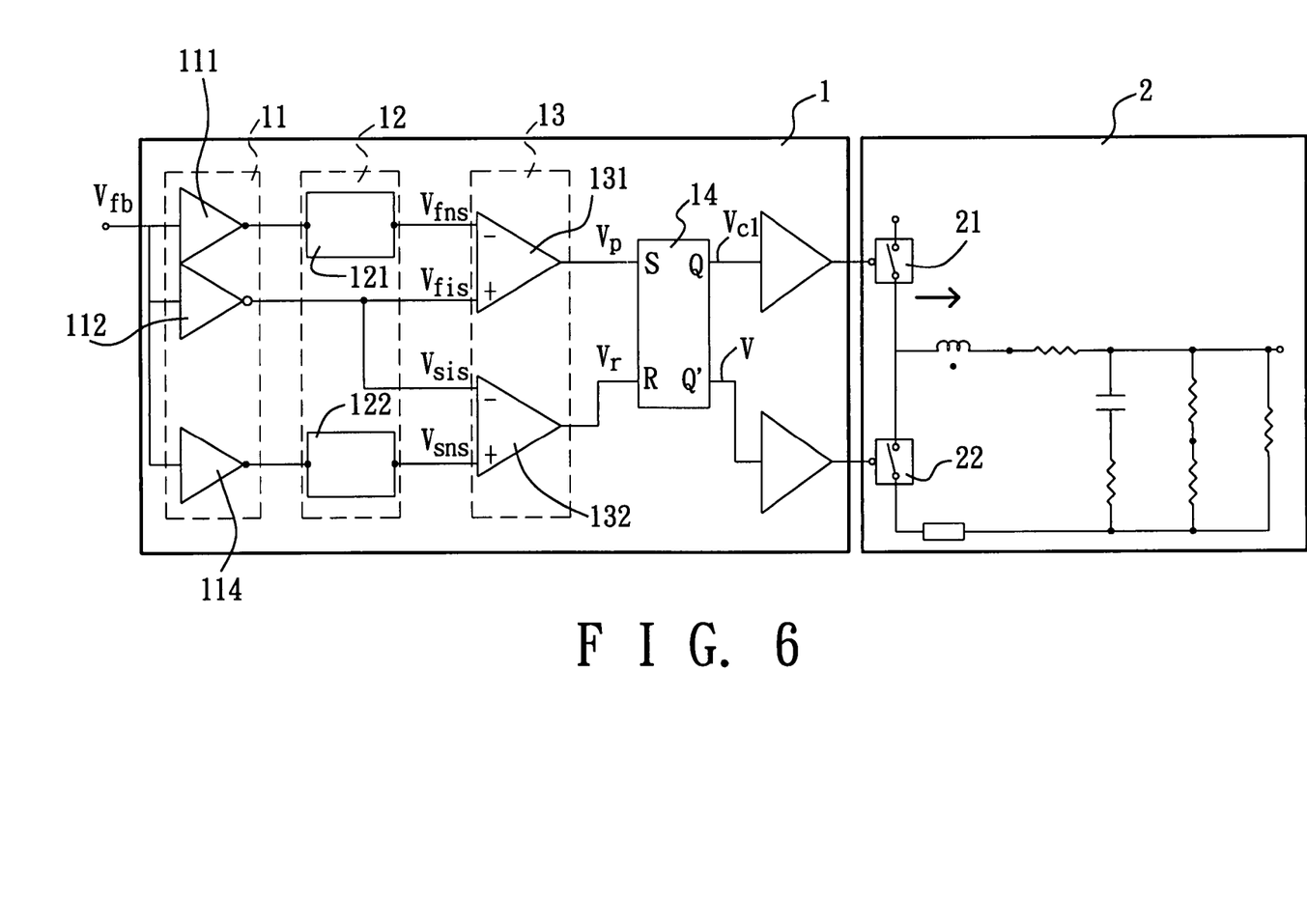
FIG. 6 is a schematic circuit diagram of the second preferred embodiment of a pulse width modulator coupled to the passive network according to the present invention.

FIG. 6 illustrates the second preferred embodiment of a pulse width modulator 1 according to the present invention. When compared with the previous embodiment, the first inverting amplifier 112 provides the first and second inverted voltage signals (Vfis, Vsis), and the second inverting amplifier 113 (see FIG. 4) is dispensed with, thereby lowering manufacturing costs of the pulse width modulator 1.

Since the operation of the pulse width modulator 1 of this embodiment is similar to that described hereinabove in connection with the previous embodiment, a detailed description of the same will be dispensed with herein for the sake of brevity.

Figure 7:
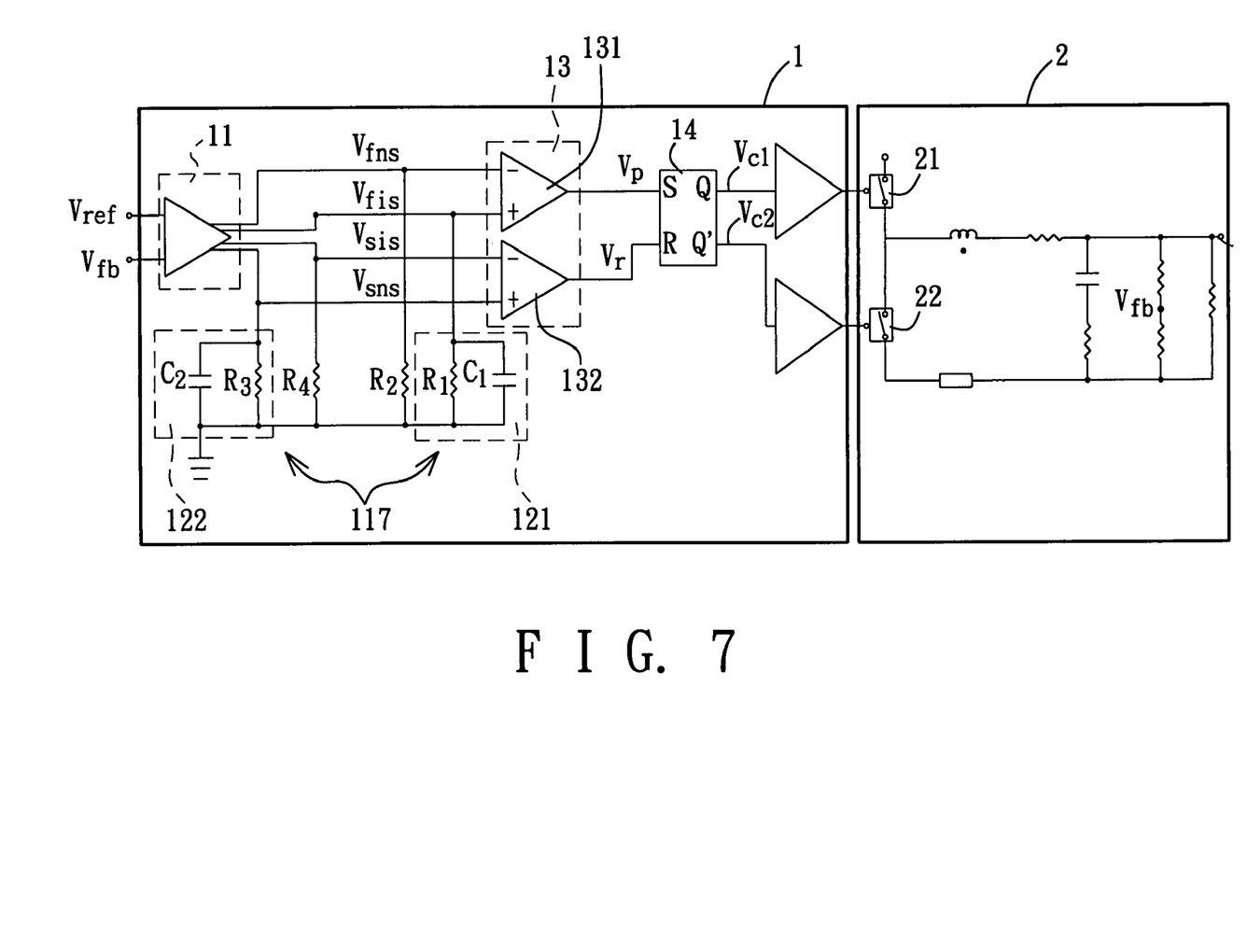
FIG. 7 is a schematic circuit diagram of the third preferred embodiment of a pulse width modulator coupled to the passive network according to the present invention.
Figure 8:
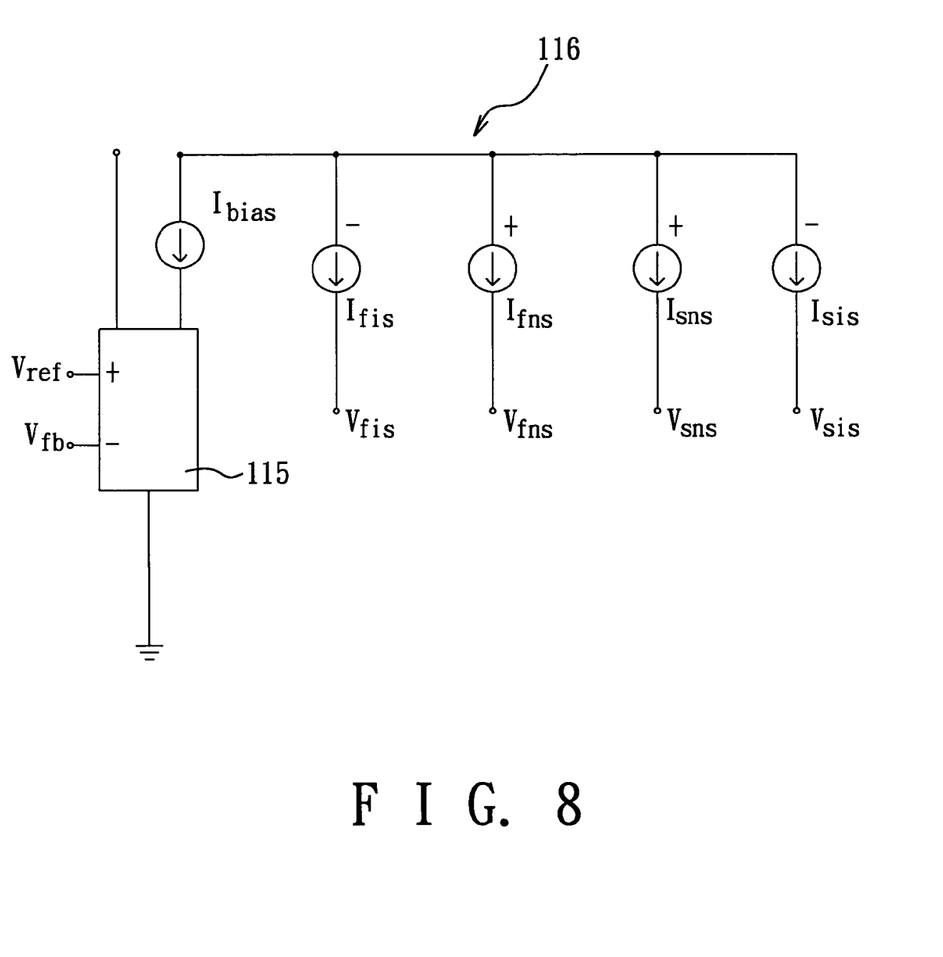
FIG. 8 is a schematic circuit diagram to illustrate a transconductance amplifier and a current mirror circuit of an amplifier module of the third preferred embodiment.

FIG. 7 illustrates the third preferred embodiment of a pulse width modulator 1 according the present invention. When compared with the previous embodiments, the amplifier module 11 includes a transconductance amplifier 115 (see FIG. 8), a current mirror circuit 116 (see FIG. 8) coupled to the transconductance amplifier 115, and a resistive load 117 coupled to the current mirror circuit 116. The transconductance amplifier 115 is adapted to receive the feedback voltage signal (Vfb) and a reference voltage signal (Vref). The current mirror circuit 116 is operable so as to generate first and second non-inverted current signals (Ifns, Isns) and first and second inverted current signals (Ifis, Isis) in response to the feedback voltage signal (Vfb) and the reference voltage signal (Vref), as shown in FIG. 8. The resistive load 117 includes a plurality of resistors (R1, R2, R3, R4). Each of the current signals (Ifis, Ifns, Isns, Isis) flows through a respective one of the resistors (R1, R2, R3, R4) of the resistive load 117. As a consequence, each of the resistors (R1, R2, R3, R4) of the resistive load 117 provides a voltage drop that serves as a respective one of the voltage signals (Ifis, Ifns, Isns, Isis).

Furthermore, the first low-pass filter circuit 121 includes the resistor (R1), and a capacitor (C1) coupled across the resistor (R1), whereas the second low-pass filter circuit 122 includes the resistor (R2), and a capacitor (C2) coupled across the resistor (R2).

It is noted that the resistors (R1, R2, R3, R4) of the resistive load 117 determine the amplifier gain of the transconductance amplifier 115.

Since the operation of the pulse width modulator 1 of this embodiment is similar to that described hereinabove in connection with the previous embodiments, a detailed description of the same will be dispensed with herein for the sake of brevity.

When a bias current (Ibias) (see FIG. 8) is applied to the transconductance amplifier 115, the current signals (Ifis, Ifns, Isns, Isis), for a unity current mirror ratio, can be calculated using the following formulas:

$$Ifis = Ibias - K(Vfb - Vref)$$

$$Ifns = Ibias + K(Vfb - Vref)$$

$$Isns = Ibias + K(Vfb - Vref)$$

$$Isis = Ibias - K(Vfb - Vref)$$

where K is the amplifier gain of the transconductance amplifier 115. Similarly, the voltage signals (Vfis, Vfns, Vsns, Vsis), for a unity current mirror ratio, can be calculated using the following formulas:

$$Vfis = [Ibias - K(Vfb - Vref)] * R1$$

$$Vfns = [Ibias + K(Vfb - Vref)] * R2$$

$$Vsns = [Ibias + K(Vfb - Vref)] * R3$$

$$Vsis = [Ibias - K(Vfb - Vref)] * R4$$

Figure 9:
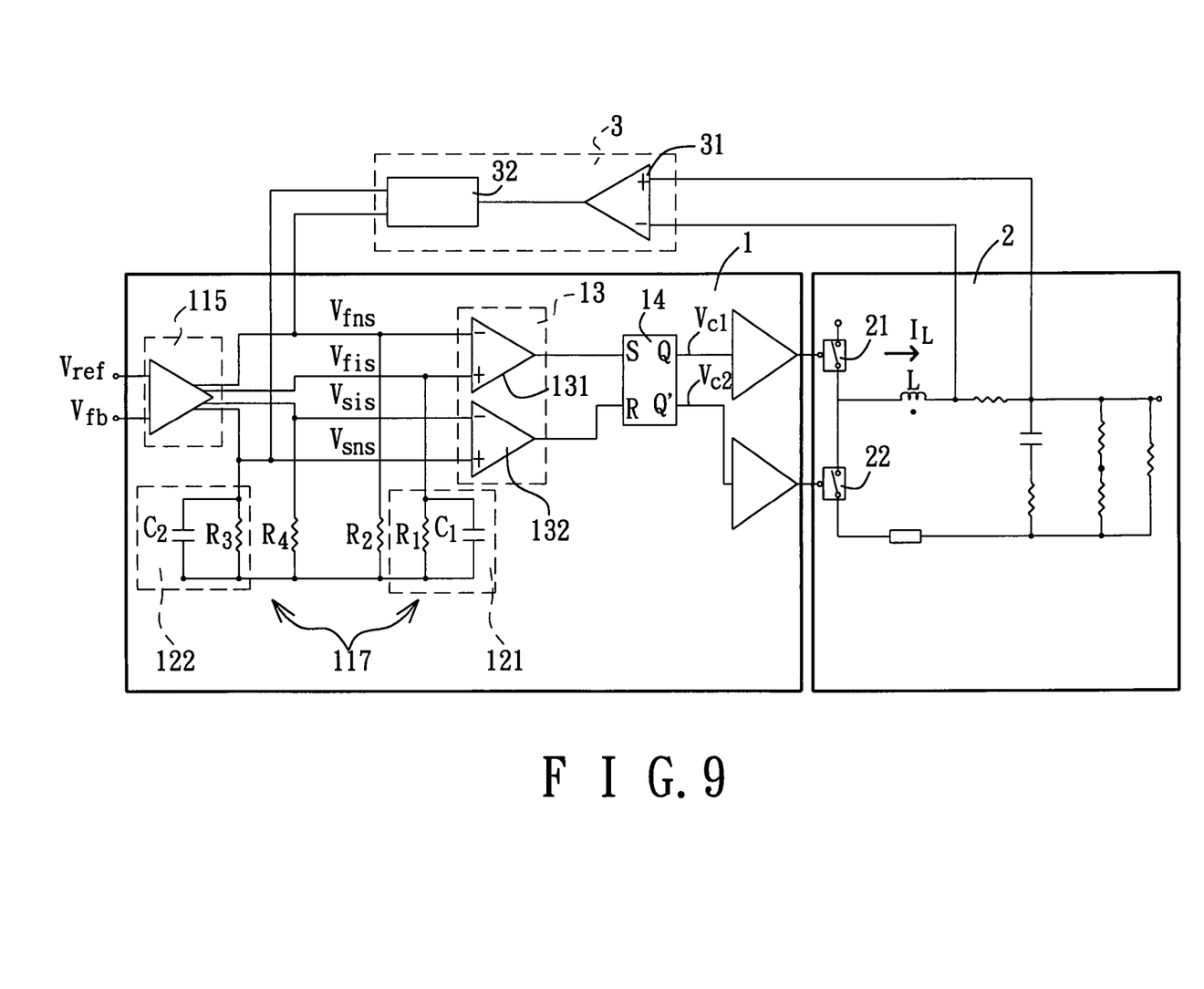
FIG. 9 is a schematic circuit diagram of the fourth referred embodiment of a pulse width modulator coupled to the passive network according to the present invention.

FIG. 9 illustrates the fourth preferred embodiment of a pulse width modulator 1 according the present invention. When compared with the third embodiment, the pulse width modulator 1 further comprises a power converter module 3 that is operable so as to lower the first and second non-inverted voltage signals (Vfns, Vsns). In particular, the power converter module 3 includes a transconductance circuit 31, and a sample-and-hold circuit 32 coupled between the transconductance circuit 31 and the comparator module 13. The transconductance circuit 31 of the power converter module 3 has an input side that is adapted to be coupled to the passive network 2 and that receives an inductor current (IL) obtained from the passive network 2. The sample-and-hold circuit 32 of the power converter module 3 has an output side that is coupled to the first input terminal of the first differential amplifier 131 and the second input terminal of the second differential amplifier 132, and that provides direct-current current signals (Idc1, Idc2) corresponding to the inductor current (IL).

Since the operation of the pulse width modulator 1 of this embodiment is similar to that described hereinabove in connection with the previous embodiments, a detailed description of the same will be dispensed with herein for the sake of brevity.

It has thus been shown that the pulse width modulator 1 of this invention includes an amplifier module 11 that generates first and second non-inverted voltage signals (Vfns, Vsns) and first and second inverted voltage signals (Vfis, Vsis) in response to a feedback voltage signal (Vfb) from a passive network 2, a comparator module 13 that provides differential voltage signals (Vp, Vr) in response to a respective one set of the first non-inverted voltage signal and the first inverted voltage signal (Vfns, Vfis) and the second non-inverted voltage signal and the second inverted voltage signal (Vsns, Vsis), and a filter module 12 that is operable so as to attenuate high frequency components of the first and second non-inverted voltage signals (Vfns, Vsns). As such, since noise in the first non-inverted voltage signal (Vfns) is filtered out before being compared with the first inverted voltage signal (Vfis) and since noise in the second non-inverted voltage signal (Vsns) is filtered out before being compared with the second inverted voltage signal (Vsis), differential operation efficiency of the comparator module 13 is substantially improved, thereby avoiding erratic behavior of the pulse width modulator 1 of this invention due to the presence of noise in the feedback voltage signal (Vfb).

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A pulse width modulator operable so as to provide control signals for controlling on and off operations of a pair of switches of a passive network, a feedback voltage signal being obtained from the passive network, said pulse width modulator comprising:

an amplifier module adapted to receive the feedback voltage signal, and operable so as to generate first and second non-inverted voltage signals and first and second inverted voltage signals in response to the feedback voltage signal;

a comparator module including
a first differential amplifier that has a first input terminal for receiving the first non-inverted voltage signal, a second input terminal for receiving the first inverted voltage signal, and an output terminal for providing a first differential voltage signal corresponding to the first non-inverted voltage signal and the first inverted voltage signal, and
a second differential amplifier that has a first input terminal for receiving the second inverted voltage signal, a second input terminal for receiving the second non-inverted voltage signal, and an output terminal for providing a second differential voltage signal corresponding to the second non-inverted voltage signal and the second inverted voltage signal;

a filter module coupled between said amplifier module and said comparator module, said filter module being operable so as to attenuate high frequency components of one set of the first and second non-inverted voltage signals and the first and second inverted voltage signals; and a flip-flop having an input side that receives the first and second differential voltage signals, and an output side that provides the control signals in response to the first and second differential voltage signals.

2. The pulse width modulator as claimed in claim 1, wherein said first and second input terminals of said first differential amplifier are inverting and non-inverting input terminals, respectively, and said first and second input terminals of said second differential amplifier are inverting and non-inverting input terminals, respectively.

3. The pulse width modulator as claimed in claim 1, wherein said flip-flop is an RS flip-flop having an S input that receives the first differential voltage signal, and an R input that receives the second differential voltage signal.

4. The pulse width modulator as claimed in claim 1, wherein said amplifier module includes
a first non-inverting amplifier having an input terminal that receives the feedback voltage signal, and an output terminal that provides the first non-inverted voltage signal,
a second non-inverting amplifier having an input terminal that receives the feedback voltage signal, and an output terminal that provides the second non-inverted voltage signal,
a first inverting amplifier having an input terminal that receives the feedback voltage signal, and an output terminal that provides the first inverted voltage signal, and
a second inverting amplifier having an input terminal that receives the feedback voltage signal, and an output terminal that provides the second inverted voltage signal.

5. The pulse width modulator as claimed in claim 4, wherein said filter module includes
a first low-pass filter circuit coupled between said output terminal of said first non-inverting amplifier and said first input terminal of said first differential amplifier, and operable so as to attenuate the high frequency components of the first non-inverted voltage signal; and
a second low-pass filter circuit coupled between said output terminal of said second non-inverting amplifier and said second input terminal of said second differential amplifier, and operable so as to attenuate the high frequency components of the second non-inverted voltage signal.

6. The pulse width modulator as claimed in claim 1, wherein said amplifier module includes
a first non-inverting amplifier having an input terminal that receives the feedback voltage signal, and an output terminal that provides the first non-inverted voltage signal,
a second non-inverting amplifier having an input terminal that receives the feedback voltage signal, and an output terminal that provides the second non-inverted voltage signal, and
an inverting amplifier having an input terminal that receives the feedback voltage signal, and an output terminal that provides the first and second inverted voltage signals.

7. The pulse width modulator as claimed in claim 6, wherein said filter module includes
a first low-pass filter circuit coupled between said output terminal of said first non-inverting amplifier and said first input terminal of said first differential amplifier, and operable so as to attenuate the high frequency components of the first non-inverted voltage signal; and
a second low-pass filter circuit coupled between said output terminal of said second non-inverting amplifier and said second input terminal of said second differential amplifier, and operable so as to attenuate the high frequency components of the second non-inverted voltage signal.

8. The pulse width modulator as claimed in claim 1, wherein said amplifier module includes a transconductance amplifier.

9. The pulse width modulator as claimed in claim 8, wherein said amplifier module further includes a current mirror circuit coupled to said transconductance amplifier.

10. The pulse width modulator as claimed in claim 9, wherein said amplifier module further includes a resistive load that is coupled to said current mirror circuit and that provides voltage drops, each of which serves as a respective one of the first non-inverted voltage signal, the second non-inverted voltage signal, the first inverted voltage signal, and the second inverted voltage signal.

11. The pulse width modulator as claimed in claim 10, further comprising a power converter module having an input side adapted to be coupled to the passive network, and an output side coupled to said first input terminal of said first differential amplifier and said second input terminal of said second differential amplifier.

12. The pulse width modulator as claimed in claim 11, wherein said power converter module includes a transconductance circuit, and a sample-and-hold circuit coupled between said transconductance circuit and said comparator module.

* * * * *